United States Patent [19]

Hennessy et al.

[11] Patent Number: 5,381,729
[45] Date of Patent: Jan. 17, 1995

[54] FOOD WARMING VESSEL FOR CAFETERIAS AND RESTAURANTS

[75] Inventors: Joseph J. Hennessy, Maple Plain; John V. Drube, St. Louis Park; Eugine W. Goad, Dayton, all of Minn.

[73] Assignee: Industrial Design & Engineering Associates, Rogers, Minn.

[21] Appl. No.: 119,290

[22] Filed: Sep. 9, 1993

Related U.S. Application Data

[63] Continuation-in-part of Ser. No. 992,837, Dec. 18, 1992, Pat. No. 5,269,217, which is a continuation-in-part of Ser. No. 693,459, Apr. 29, 1991, Pat. No. 5,203,257.

[51] Int. Cl.6 .............................................. F24B 9/00
[52] U.S. Cl. .................................... 99/483; 99/403; 126/33; 126/377; 126/369; 219/437; 219/523; 219/433; 392/441; 392/447
[58] Field of Search ............... 99/483, 447, 401, 413, 99/415, 417, 331, 467, 468, 470, 330; 126/369, 33, 377, 378; 219/432, 433, 437, 523; 392/441, 444, 445, 447, 485

[56] References Cited

U.S. PATENT DOCUMENTS

| | | | |
|---|---|---|---|
| 1,939,715 | 12/1933 | Meitzler | 126/33 |
| 2,202,320 | 5/1940 | Sacerdote | 126/376 |
| 2,236,837 | 4/1941 | Rimmel | 219/425 |
| 2,435,981 | 2/1948 | Rawson | 392/447 |
| 2,453,425 | 11/1948 | Freed | 219/433 |
| 2,731,537 | 1/1956 | Pavelka, Jr. | 126/33 |
| 2,756,425 | 7/1956 | Webber | 126/378 |
| 3,130,288 | 4/1964 | Monaco et al. | 126/369 |
| 3,288,054 | 11/1966 | Weprin et al. | 99/447 |
| 3,748,439 | 6/1973 | Ting et al. | 219/353 |
| 3,760,147 | 9/1973 | Tyrey | 219/217 |
| 3,892,945 | 7/1975 | Lerner | 219/432 |

(List continued on next page.)

FOREIGN PATENT DOCUMENTS 2198631 6/1988 United Kingdom .

OTHER PUBLICATIONS

Parts List: "Soup'R Chef, Model TW-665"; IDEA Medalie Division; Rogers Minn.; Oct. 1, 1989.

(List continued on next page.)

Primary Examiner—Timothy F. Simone
Attorney, Agent, or Firm—James V. Harmon

[57] ABSTRACT

The warming device of the present invention includes a food tray or pan formed from metal so as to promote the conduction of heat to the food contained in the pan. The pan is held within a sump vessel adapted to contain a heat transfer fluid such as water. The sump vessel is a unitary bowl-shaped container having side and bottom walls and an upper open wide mouth for receiving the food pan whereby the food pan, when inserted, is located within the sump vessel so that the bottom portion of the food pan is spaced from the wall of the sump vessel to define a chamber suited for containing water and steam between the sump vessel and the food pan. The sump vessel has heat-insulating qualities that reduce heat loss and promote the transmission of heat to the food pan. A heat dissipator plate formed from a metal or other conductor of heat is connected to a wall of the sump vessel with an air space between the heat dissipator plate and the sump vessel. An electrical heating element is located in this space and is connected in heat conductive relationship to the heat dissipation plate which efficiently transfers heat to the food pan. The air space and the wall of the sump vessel on the other side of the air space from the heat dissipator plate reduce the loss of heat from the heating element to the environment.

12 Claims, 10 Drawing Sheets

U.S. PATENT DOCUMENTS

| | | | |
|---|---|---|---|
| 4,215,267 | 7/1980 | Kaebitzsch | 219/439 |
| 4,246,955 | 1/1981 | Skala | 165/26 |
| 4,284,880 | 8/1981 | Keiser | 219/145 |
| 4,480,174 | 10/1984 | Hummel | 219/331 |
| 4,731,251 | 3/1988 | Jovanovic | 426/243 |
| 4,779,605 | 10/1988 | Smith et al. | 126/33 |
| 4,797,536 | 1/1989 | Handley | 219/494 |
| 5,045,672 | 9/1991 | Scott | 219/439 |
| 5,119,800 | 6/1992 | Roberts et al. | 126/377 |
| 5,203,257 | 4/1993 | Goad | 99/483 |
| 5,269,217 | 12/1993 | Goad | 99/483 |

OTHER PUBLICATIONS

*Parts List:* "Model 4, 7 & 11 Food Warmer"; IDEA Medalie Division; Rogers Minn.; May 1, 1990.

*Parts List:* "Model 2000 & 2001 Food Warmer"; IDEA Medalie Division, Rogers Minn.; Aug. 1, 1987.

*Parts List:* "Food or Topping Warmer Model TW-24"; IDEA Medalie Division, Rogers Minn.; date unknown.

*Parts List:* "Soup'R Cooker Model 6105 & 685"; IDEA Medalie Division, Rogers Minn.; Sep. 1, 1990.

*Parts List:* "Magnum Model 6125"; Idea Medalie Division, Rogers Minn.; May 1, 1990.

*Parts List: "Colonial Kettle TM Model 1776 & 1777";* IDEA Medalie Division, Rogers Minn.; Jun. 1, 1990.

*Parts List:* "DECO Hot Shot TM"; IEDA Medalie Division, Rogers Minn.; Sep. 1, 1988.

*Parts List:* "Model 260 Food Warmer"; IDEA Medalie Division, Rogers Minn.; May 1, 1990.

*Parts List:* "DECO Food Warmer Model 1925"; IDEA Medalie Division, Rogers Minn.; May 1, 1988.

*Product Sheet:* IEDA Foodservice Equipment Product Sheet; IDEA Medalie Division, Rogers Minn., date unknown.

FOOD WARMING VESSEL FOR CAFETERIAS AND RESTAURANTS

This is a continuation-in-part of my prior application Ser. No. 07/992,837, filed Dec. 18, 1992, now U.S. Pat. No. 5,269,217 which is in turn continuation-in-part of application Ser. No. 07/693,459, filed Apr. 29, 1991, now U.S. Pat. No. 5,203,257.

FIELD OF THE INVENTION

The invention relates to food warmers and more particularly to food warmers that are suited for institutional use, e.g., in cafeterias and restaurants.

BACKGROUND OF THE INVENTION

Restaurants and institutions commonly hold and serve hot foods from electrically operated countertop food warmers. Water is usually, but not necessarily, used in the wells of the warmer to act as a heat transfer medium and to improve thermal efficiency. These warmers are designed to hold 12"×20" steam table pans or combinations of fractionally sized pans in various depths with the use of an adaptor plate formed from a sheet of metal with one or more openings. The warmers may also be used to hold a variety of round shouldered vegetable pans or inserts. The rectangular vegetable pans or inserts are supported by a lip which extends outwardly at the top of the pan and rests on the top edge of the warmer well. In addition to support, the lip acts as a loose seal to prevent the escape of large amounts of steam from the area between the bottom of the well and the bottom of the pan. Like the rectangular pans, the adaptor plates also have lips and flanges to provide support and act as a steam seal.

The arrangement commonly employed for use in restaurants and cafeterias prior to the present invention is exemplified by U.S. Pat. No. 4,284,880 which describes a metal food pan surrounded by an insulated housing that has a pair of spaced apart metal walls between which is stuffed fiberglass insulation. An electrical heating element provided in the unit is not exposed to the metal food tray but is instead mounted below a metal plate which is itself spaced a few inches below the food tray. U.S. Pat. No. 4,215,267 is similar except that the electrical heater is mounted below a heavy heat distribution plate. Heat is not transmitted efficiently to the food tray in these devices because the electric heater is in physical contact with the housing and is not facing, i.e., exposed directly to, the food tray. Moreover, the double-walled housing filled with insulation is expensive, time consuming to assemble, and presents an undesirable environmental impact. U.S. Pat. No. 5,045,672 is generally similar except that the water pan which consists of a single thickness of sheet metal will suffer from substantial heat losses, defeating a primary objective of the invention which is to provide excellent thermal efficiency while at the same time eliminating the need for an expensive insulation-filled metal housing.

U.S. Pat. No. 3,130,288 discloses a food service device which includes a deep outer pan containing a water bath and an inner tray for holding food. Both the tray and the pan are formed from transparent plastic sheet material such as a thermoplastic (Lucite or Plexiglas) or a thermosetting material. An electric heating element is placed in contact with the inside of the pan. This device has several shortcomings. First, the electric heater can cause localized overheating and damage to the material from which the pan is formed. More importantly, because both the food tray and the water bath pan are formed from plastic material, they are both heat insulators. Consequently, heat is not transmitted efficiently to the food. Finally, much infrared radiation will escape through the transparent plastic walls of the unit.

In view of these and other deficiencies of the prior art, it is one object of the invention to provide an improved food warmer for restaurants, cafeterias and the like in which heat loss is minimized and the requirement for an expensive fiberglass-filled sheet metal housing is eliminated while at the same time enabling heat to be conducted very efficiently from the electric heating element to the food within the food tray.

Another object of the invention is to provide a food warming device for cafeterias, restaurants and the like having a rigid monolithic sump vessel of a composition which provides excellent strength and impact resistance, outstanding heat insulating qualities and is not subject to stress cracking or other damage after repeated cycles of exposure to boiling water over a period of many months or years of use.

These and other more detailed and specific objects of the present invention will be apparent in view of the following description setting forth by way of example but a few of the various forms of the invention that will be apparent to those skilled in the art once the principles described herein are understood.

SUMMARY OF THE INVENTION

In accordance with the present invention, a food warming device is provided that is particularly well adapted for use in restaurants and cafeterias. The warming device includes a food tray or pan formed from metal so as to promote the conduction of heat to the food contained in the pan. The pan is held within a non-metallic sump vessel adapted to contain a heat transfer fluid such as water. The sump vessel is a unitary bowl-shaped container having side and bottom walls and an upper open wide mouth for receiving the food pan so that the food pan, when inserted, is located within the sump vessel so that the bottom portion of the food pan is spaced from the wall of the sump vessel to define a chamber suited for containing water and steam between the sump vessel and the food pan. The sump vessel is preferably molded from plastic, most preferably a thermosetting plastic resin containing inert mineral filler particles to provide a rigid monolithic body. The inert mineral filler particles are distributed through the monolithic body of the sump vessel. The sump vessel has heat-insulating qualities that reduce heat loss and promote the transmission of heat to the food pan.

A heat dissipator plate formed from a metal to provide good heat conduction is connected to a wall of the sump vessel with a space between the heat dissipator plate and the sump vessel. An electrical heating element is located in this space and is connected in heat conductive relationship to the heat dissipation plate for transferring heat to the food pan through the heat dissipator plate. That portion of the wall of the sumo vessel on the other side of the space from the heat dissipator plate reduces the transfer of heat from the heating element to the environment. In one preferred form of the invention the heat dissipator plate rests on an upwardly projecting collar integral with the bottom wall of the sump vessel. In another form of the invention the heat dissipator plate is recessed into the bottom wall of the sump vessel.

In accordance with other preferred and optional aspects of the present invention, several important features interact to achieve the best operation. First, in a preferred optional form of the invention, a particular ratio is established between the thermal conductivity $K^1$ of the food pan and the thermal conductivity $K^2$ of the sump vessel. It is preferred that the ratio $K^1/K^2$ be at least 50 and most preferably at least about 100. In other words, the thermal conductivity of the food pan should be at least about 50 times and preferably at least about 100 times greater than that of the sump vessel. It was found that this can be accomplished by forming the food pan or tray from a heat conductive metal such as stainless steel or aluminum and the sump vessel from a rigid, monolithic thermosetting plastic resinous body containing a relatively high content (over 15% by weight) of chemically inert particulate mineral filler material. The most preferred fillers are metal silicates, metal oxides and/or metal carbonates. It is preferred that the inert mineral filler comprise at least about 15% by weight of the vessel and most preferably from about 30% to about 80% by weight of the vessel. The balance, typically from about 20% to about 50% by weight of the vessel, is a thermosetting plastic resin in which the filler is uniformly distributed. The particulate filler material can consist either of powdered material or fibers such as glass fibers, but is preferably a mixture of both.

During fabrication, the resin is cured, i.e., sets up hard, to form a monolithic rigid sump vessel structure containing the inert mineral filler particles. After it has cured, the resin is irreversibly converted to a rigid material that will not return to its former plastic condition but instead will char when exposed to high heat. The resin is relatively heavily loaded or filled with the inert mineral filler particles.

In one typical application of the invention utilizing polyester resin that is cured with a peroxide type catalyst, the ratio of filler to resin is about 3 to 1 parts by weight. Thus, there is about three times as much filler as resin. The sump vessel has excellent heat insulating qualities, good strength, excellent impact resistance and a high dielectric constant. All quantities herein are expressed as percent or parts by weight.

The thermal conductivity $K^2$ of the sump vessel is preferably in the range of about 0.5-3.0 BTU/hr/sq ft/degree F/inch thickness. In one typical example of the invention, the thermal conductivity value $K^2$ of the sump vessel was about 1.3 BTU/hr/sq ft/degree F/inch thickness. If the food pan is formed from aluminum, the thermal conductivity ratio $K^1/K^2$ is about 1,000. However, if the food pan is formed from stainless steel, $K^1/K^2$ is about 240. By having $K^1/K^2$ be at least 50, the sump vessel will provide excellent heat insulating qualities and the heat produced by the heating element will be readily transmitted through the food pan to the food.

THE FIGURES

DETAILED DESCRIPTION OF THE INVENTION

Figure 1:
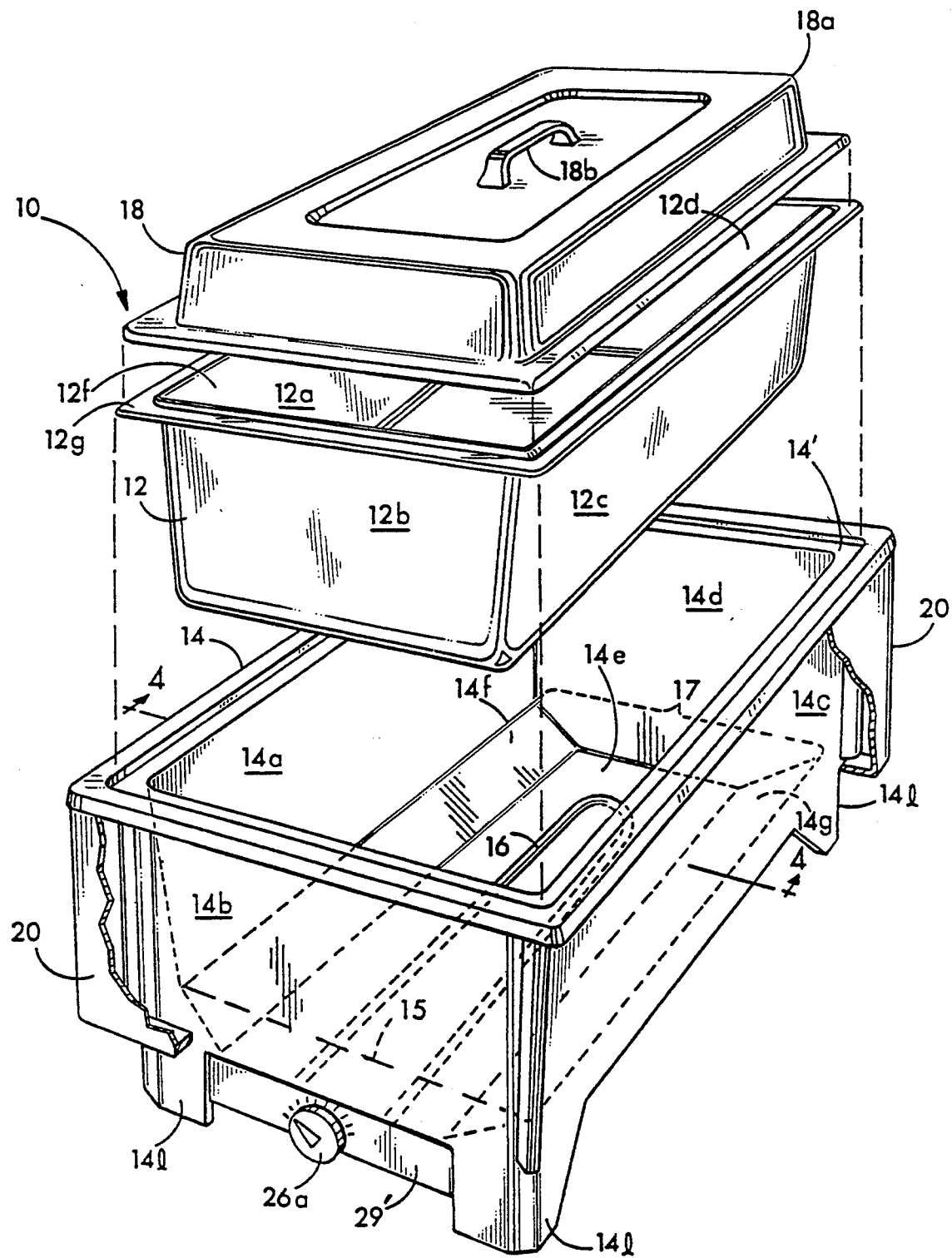
FIG. 1 is an exploded perspective view of the invention.

Refer now to FIGS. 1–5 which illustrate a rectangular food warmer 10 embodying one form of the invention. The main components of the food warmer 10 are the following: a food containment vessel or food tray 12 which fits inside a well or sump vessel 14, an electrical resistance heater 16 and optionally a cover 18 and housing 20. The warming vessel can be made in a round, oval or rectangular cross-section as illustrated.

The food containing pan or tray 12 is formed from a good conductor of heat such as metal, the most preferred being aluminum or stainless steel. While the tray 12 can be formed by casting, stamped sheet metal is preferred. If the pan 12 is formed from aluminum, it can have a thickness of about 0.025 to 0.05 inch, or if made of stainless steel about 18 gauge to 22 gauge, i.e., about 0.029 to 0.049 inch thick. The conductivity value $K^1$ of the pan 12 will be about 0.5 cal-cm/sec-cm$^2$C° for aluminum and about 0.12 cal-cm/sec-cm$^2$C° for stainless steel, or expressed in BTU-in/hr-ft$^2$-F° units, about 1300 BTU-in/hr-ft$^2$-F° and 315 BTU-in/hr-ft$^2$-F°, respectively. If desired, the pan 12 can have a black coating on its lower surface, e.g., a black oxide coating, to promote heat absorption.

The pan 12 includes four upright side walls 12a–12d which preferably taper outwardly, a flat bottom wall 12e and a wide mouth 12f which opens upwardly. At the upper edge of the side walls 12a–12d is a laterally extending supporting flange or rim 12g which, during use, rests in a notch or recess 14' of the sump vessel 14. The notch 14' is molded into the upper surface of the lip 13 at the upper edge of the sump vessel 14 to help direct the flow of condensed vapor back into the sump vessel 14. This helps to prevent the loss of heat and moisture. The cover 18 includes a downwardly directed lower peripheral edge 18a which rests on the flange 12g. The cover 18 is preferably provided with a handle 18b. In some cases, the handle 18b is replaced with a flat, strap-style handle 18c (FIG. 2) which extends straight across the top of the recess 18d in the top of the cover 18 of sufficient size to accommodate a person's hand. In a typical situation, the food tray 12 is rectangular, measuring 12 inches by 20 inches and is about 8 inches deep.

It will be noted that there is provided a chamber 22 for steam and hot air between the food tray 12 and the sump vessel 14. Chamber 22 includes a lower portion 22a that extends horizontally and an upwardly extending portion 22b which surrounds the containment vessel 12 on all sides. It will thus be seen that the chamber 22 is generally dish-shaped in configuration. It will also be noticed that there are no walls or other barriers between the food tray 12 and sump vessel 14.

In order to provide the required conductivity ratio $K^1/K^2$ between the food tray 12 and the sump vessel 14, the sump vessel 14 has a special composition. The sump vessel 14 is formed from a rigid, monolithic thermosetting plastic resinous body containing a high content (over 15% by weight) of chemically inert particulate mineral filler material. The most preferred filler is metal oxide and/or metal carbonate. The particulate filler can consist either of particles, i.e., a powdered material, or fibers such as glass fibers but is preferably a mixture of both. It is most preferred that the inert mineral filler comprise at least about 30% by weight of the vessel. The balance, typically from about 20% to about 50% by weight of the vessel, is a cured thermosetting plastic resin in which the filler is uniformly distributed. During fabrication, the resin is cured to form the monolithic rigid structure which contains the inert mineral filler. After being cured, the resin is irreversibly converted to a rigid material that will not return to its former plastic condition but instead will char when exposed to high heat.

The resin is preferably relatively heavily loaded with the inert mineral filler particles. In one typical application of the invention utilizing polyester resin that is cured with a peroxide type catalyst, the ratio of filler to resin is about 3 parts to 1 part by weight so that there is in effect about three times as much filler as resin. When a polyester resin is used to form sump vessel 14, the formulation comprises about 72 parts by weight of an inert particulate mineral filler, 22 parts by weight resin and catalyst, and the balance of 6 parts by weight of a mold release and shrinkage reducer. This gives the sump vessel 14 excellent heat insulating qualities, good strength, excellent impact resistance, a high dielectric constant, and a conductivity $K^2$ within the range given below.

The thermal conductivity $K^2$ of the sump vessel 14 should be in the range of about 0.5-3.0 BTU/hr/sq ft/degree F/inch thickness. In one typical example of the invention, the thermal conductivity value $K^2$ of the sump vessel was about 1.3 BTU/hr/sq ft/degree F/inch thickness. Thus, when the food pan is formed from aluminum, the thermal conductivity ratio $K^1/K^2$ is about 1,000. However, if the food pan is formed from stainless steel, $K1/K2$ is about 240. It is preferred that the ratio $K1/K2$ be at least about 50 and preferably greater than 100. By having a ratio $K1/K2$ of at least 50, the sump vessel 14 will provide excellent heat insulating qualities and heat from the heating element 16 will be readily transmitted through the food tray 12 to the food. In addition, infrared radiation will be reflected from the electric heating element 16 toward the food tray 12 containing the food.

The inert mineral filler can comprise particles of any suitable mineral, especially powdered minerals such as clay (magnesium or aluminum silicate), alumina trihydrate ($Al_2O_3 \cdot 3H_2O$), calcium carbonate ($CaCO_3$), titanium dioxide ($TiO_2$), zinc oxide ($ZnO$), fiberglass or silica ($SiO_2$), alumina ($Al_2O_3$), lime ($CaO$), ferric oxide ($Fe_2O_3$), black iron oxide ($Fe_3O_4$), potassium oxide ($K_2O$), phosphorus oxide ($P_2O_5$), magnesium oxide ($MgO$), sodium oxide ($Na_2O$), manganese oxide ($Mn_3O_4$), barium oxide ($BaO$) and the like.

In accordance with the present invention, a highly filled thermosetting resin is especially preferred. To form the sump vessel 14, the filler is wetted with the resin during a preliminary mixing step. When a thermosetting polyester resin is used, a catalyst such as a peroxide catalyst, e.g. tertiary butyl perbenzoate in the amount of about 1 part catalyst for each 15 parts of unsaturated liquid polyester resin, is used. In addition, chips of polyester resin such as a mixture of black and white polyester chips can be used in addition to the liquid polyester resin. The filler comprises at least about 15% by weight and preferably about 30% to 80% by weight of the sump vessel 14. The resin can make up about 20% to 50% by weight of the sump vessel 14 to make a total of 100%. If desired, a minor amount of zinc stearate or other suitable known parting agent can be used to assist in mold release. If desired, a known shrinkage reducing agent such as polyethylene can be used.

The resulting sump vessel has excellent heat insulating qualities, good dielectric strength, and will reflect radiant energy from the electric heating element 16 back to the food tray 12. On the other hand, if the sump vessel is transparent as described in U.S. Pat. No. 3,130,288, much of the radiant heat will be permitted to escape, which is of course unacceptable. The sump vessel 14 also has good impact resistance and low moisture absorption. In addition, the sump vessel 14 has excellent dielectric strength. The dielectric strength S.T., perp., VPM is about 350 volts/mil of thickness (ASTM Test D149). The preferred dielectric strength range is between about 100 and 500 volts/mil of thickness. The side walls and bottom wall of the sump vessel 14 can be about ⅛th inch thick.

While a variety of resin/filler compositions can be employed, two preferred resin/filler compositions are Resin 2203 SMC/LS by Premix Inc. of Kingsville, Ohio or Resin M103 by Industrial Dielectrics of Noblesville, Ind. One preferred composition utilized to form the sump vessel 14 has the following formulation:

| Ingredient | Parts by Weight |
| --- | --- |
| Polyester resin and catalyst | 22 |
| (Polyester resin chips, 6 parts; | |
| unsaturated liquid polyester resin, 15 parts; | |
| peroxide catalyst and inhibitor, 1 part) | |
| Inert mineral filler particles | 72 |
| ($CaCO_3$, 55 parts; | |
| fiberglass, 15 parts [mixture of | |
| ¼ and ⅜" pieces]; | |
| black fibers, 2 parts) | |
| Shrinkage reduction and mold release agent | 6 |

The resin/filler composition is mixed together as is known in the molding art and formed into a sheet which is cut into pieces that are weighed and placed in molds and molded at elevated temperature, e.g. about 300° F. to 350° F. for a period of 3-5 minutes or until the resin is cured.

In one sump vessel 14 having a wall thickness of ⅛", the thermal conductivity $K^2$ was 2.0 BTU/hr/sq ft/degree F/inch thickness and the dielectric constant at 60 Hz was 5.0-5.4 (ASTM Test D150).

The sump vessel 14 includes four upright side walls 14a-14d, a bottom wall 14e which has upwardly inclined side portions 14f and 14g that help to reflect heat upwardly from an electric heating element 16. The left end of the heating element 16, as shown in the figures, extends through the end wall 19 at the left end of the sump 17 (FIG. 2).

Figure 2:
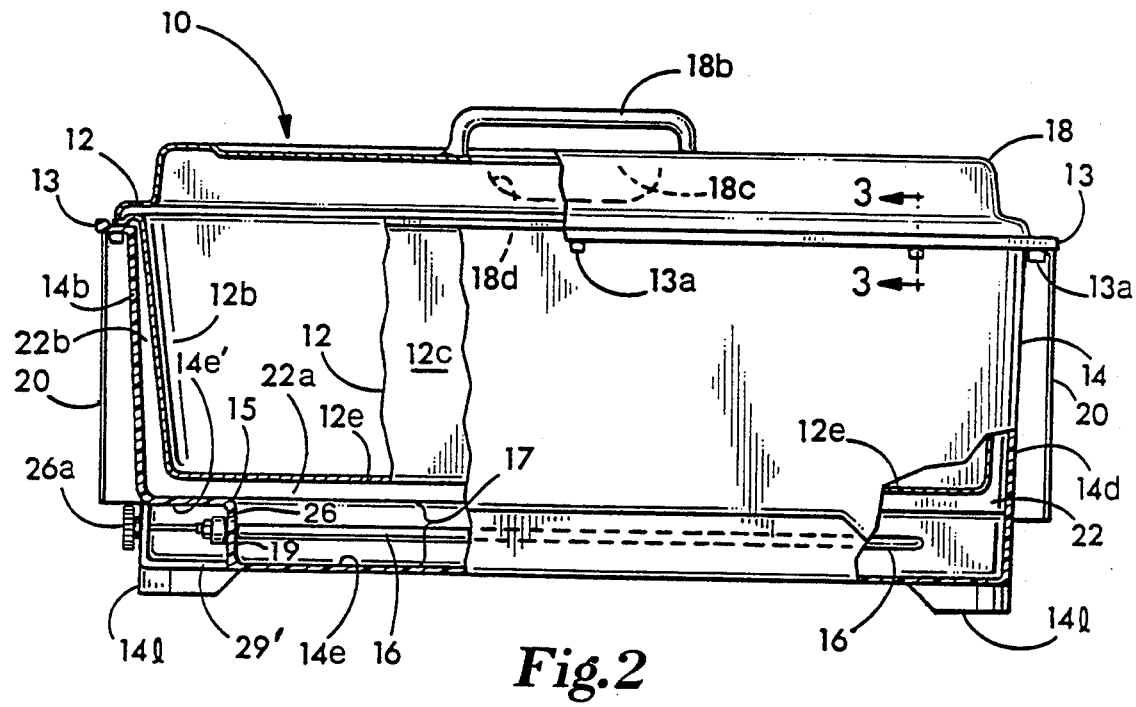
FIG. 2 is a side elevational view of the invention partly in vertical section.
Figure 3:
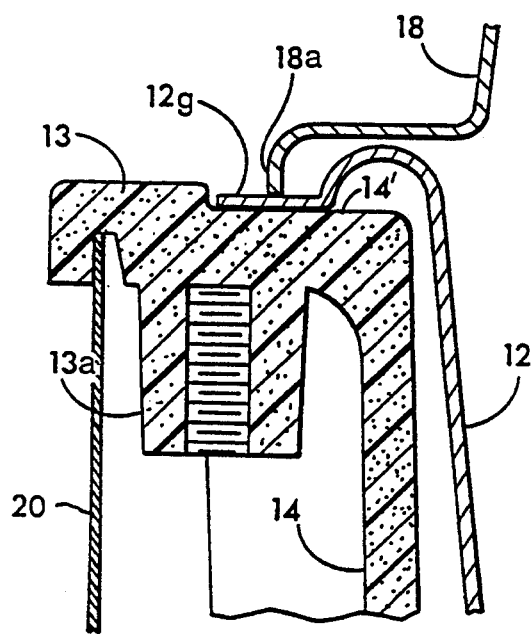
FIG. 3 is an enlarged vertical sectional view taken on line 3—3 of FIG. 2.
Figure 4:
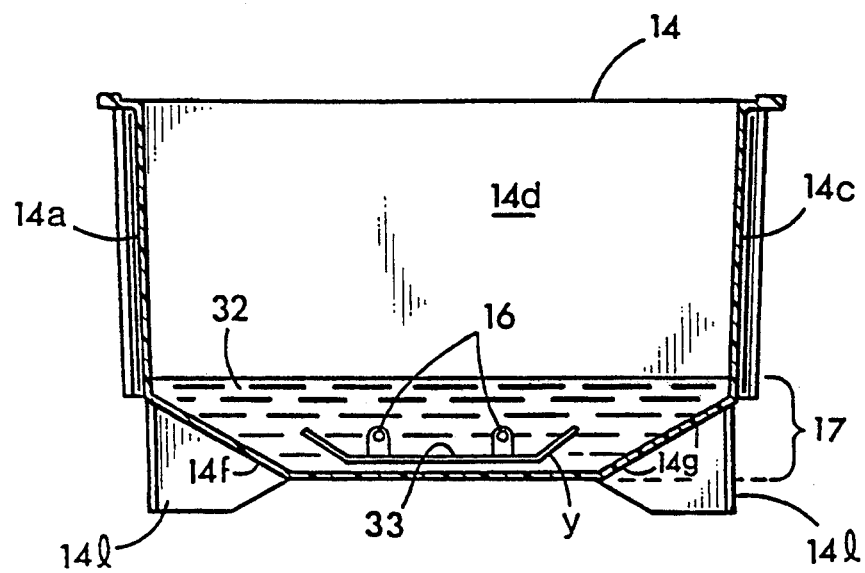
FIG. 4 is a vertical sectional view taken on line 4—4 of FIG. 1 on a reduced scale.
Figure 5:
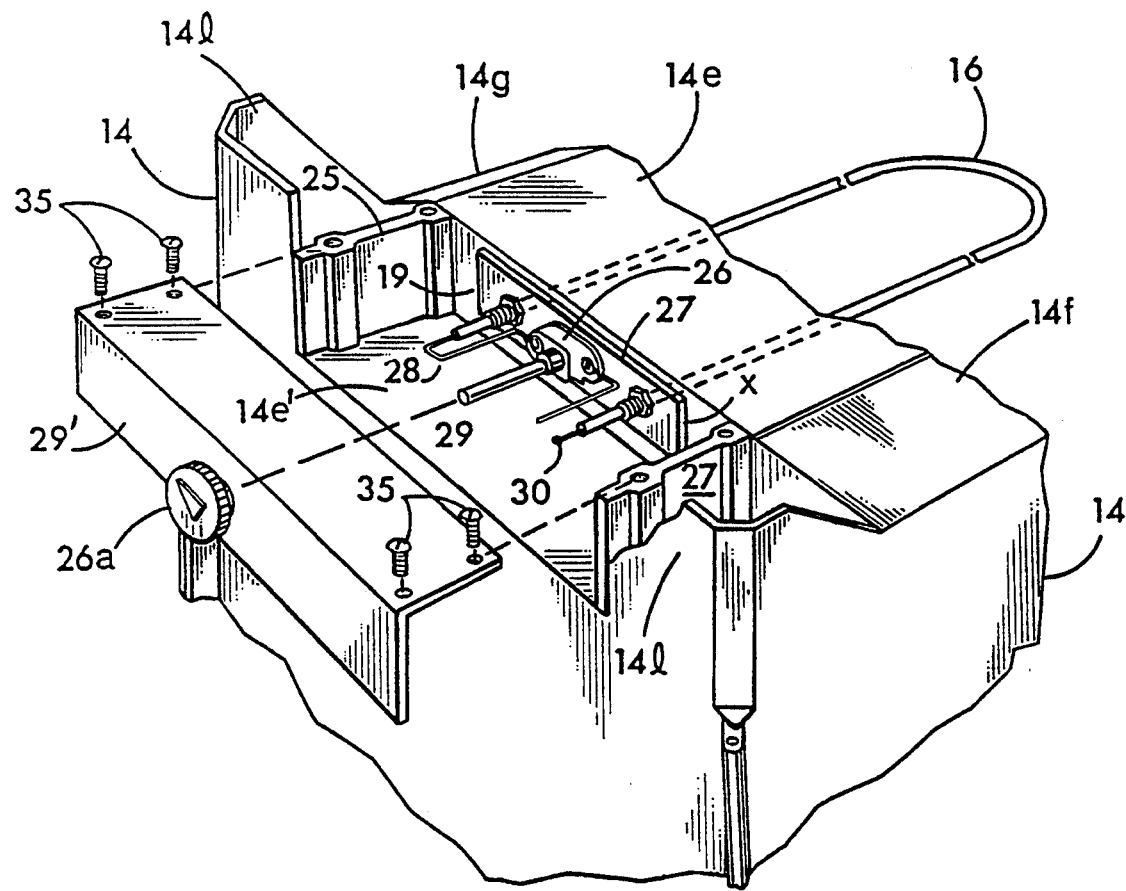
FIG. 5 is a partial perspective view of the invention with a cover removed to show electrical connections.
Figure 6:
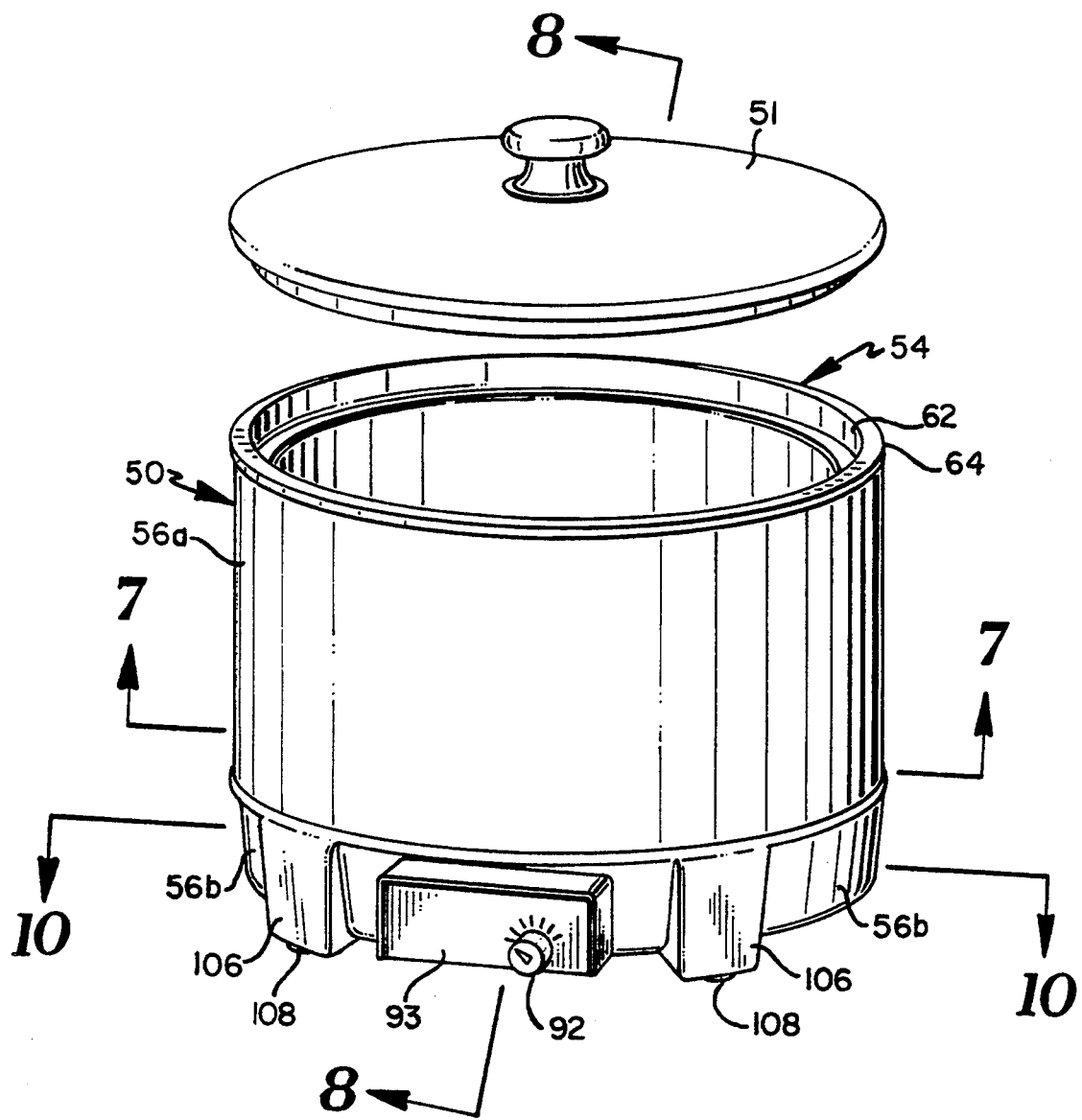
FIG. 6 is a perspective view of another form of the present invention.

As shown best in FIGS. 2 and 5, the sump vessel 14 has an indentation 15 (FIG. 2) in the side wall 14b such that the sump vessel 14 has two bottom wall portions 14e and 14e' at different elevations. Portion 14e' is elevated above the relatively deep bottom wall portion 14e so as to define the bottom of a lowered sump chamber 17. The two portions 14e and 14e' of the bottom wall are joined by upright wall 19.

The upright wall 19 can be used for supporting the electric heating element 16. In this way it will be seen that the electric heating element 16 is connected to the upright wall 19 and extends horizontally from it through the sump chamber 17 between the bottom wall 12e of the food containment vessel 12 and the bottom wall 14e of the sump vessel 14.

The indentation 15 bounded by the upper bottom wall 14e' and the upright wall 19 has a dual function; it defines the lower sump chamber 17 as well as providing a housing or junction box for a thermostat 26, electrical connections 28–30 (FIG. 5) and power supply cord (not shown). The junction box formed by the walls 14e' and 19, as well as end walls 25 and 27, is enclosed by means of a removable cover 29' that is held in place with suitable fasteners such as screws 35.

The thermostat 26 is provided with a special mounting for improving its operation and the overall operation of the apparatus. Specifically, the thermostat 26, the operation of which can be controlled by an adjustment knob 26a, is in heat conductive relationship with the heating element 16 for sensing the temperature of the element. To accomplish this, the thermostat 26 is preferably connected to a heat transfer member 27' (FIG. 5) comprising a metal bar or plate or other heat conductive substance connected at its ends to the heating element 16 for transmitting heat from the electric heating element 16 to the thermostat 26. This arrangement provides good thermal coupling which allows the thermostat 26 to sense temperature changes more quickly, thereby improving the overall operation of the apparatus. The knob 26a is positioned beneath the lower edge of the housing 20 (FIG. 2). Consequently, the knob 26a is unlikely to be bumped or tampered with, so as to accidentally change the temperature setting.

During use, water or other heat transfer medium 32 is preferably placed in the sump vessel 14, preferably to a sufficient elevation to completely cover the heating element 16. Thus, during normal operation, the sump vessel 14 is partially filled with water which covers the heating element 16 and contacts the lower aspect (side and bottom walls) of the food tray 12. In this way, heat is transferred from the heating element 16 to the food tray 12 in three ways: by infrared radiation from the heating element 16, by conduction through the water 32, and by convection through currents in the water as well as the convection of vapor which, after being boiled off, strikes the side walls 12a–12d of the food tray 12 condensing and giving up heat. While the invention is preferably operated with water 32 present, it is not essential for its use.

The sump vessel 14 has four integrally formed legs 14L. Since the legs 14L are a part of the sump vessel 14, no extra parts are required to support the sump vessel 14.

The invention has very good thermal efficiency; an efficiency on the order of about 20% better than comparable food warmers previously manufactured by the applicant. This is due in part to the fact that the heating element 16 is located entirely within the well defined by the sump vessel 14 and is spaced between the food tray 12 and the sump vessel 14. No walls or other barriers are present between the heating element 16 and the walls of the food containment tray 12. As a result, heat will flow more efficiently into the food tray 12 and the food contained therein. Efficiency is increased when water 32 is present to enhance the transfer of the heat to food containment vessel 12 by conduction and convection as well as through radiation which normally serves to transfer heat from an electric heating element to a cooler body.

When the sump vessel 14 is formed as described above from a highly filled plastic resin, it will act as a heat insulator to further improve heating efficiency. The location of the heating element 16 in the sump 17 inside the well gives the new warmer other advantages which will now be enumerated.

In the 28 years since U.S. Pat. No. 3,130,288 issued, the product has never seen widespread use in restaurants and cafeterias. The fiberglass filled housing is, however, quite popular even though about 20% to 25% of the energy used in such a food warmer is lost in trying to transfer the heat from the outside of the well to the inside. Substantial losses occur in these warmers when heat is transferred from the heating element through air, then through a heat distribution plate above the heater, and finally through air or water to reach the food tray. The present invention eliminates this problem as well as preventing possible damage to the resin from which the sump vessel 14 is formed.

Additionally, in 1993 the Environmental Protection Agency will place fiberglass insulation, in the form used to insulate a standard food warmer, in the same category for disposal as asbestos fibers. Since the highly filled thermosetting plastic sump vessel 14 resists heat damage, it can be used successfully. Because it is a poor thermal conductor and the heating element 16 is inside the well, no added insulation is necessary.

Another advantage of the invention is a provision on the sump vessel 14 for accepting and holding the top edge of the metal enclosure/housing 20, thereby eliminating the need for attachment with screws, blind rivets or by spot welding. It will also be seen that the stepped area including notch 14' molded into the top of the lip 13 of the plastic well adjacent to the inside upright walls can be used to receive the edge of the pan 12 as shown or an adaptor plate (not shown). This built-in retainer eliminates the necessity for notches or complex edge forms in the adaptor plate itself. The notch 14' molded into the top of the lip 13 of the plastic well also helps to keep moisture that has condensed from escaping from the well and spilling over the side of the warmer.

The sump chamber 17 of the sump vessel 14 adds approximately twice the water capacity of a vessel without such a chamber. The added water capacity is a highly desirable feature because it reduces the number of refills required.

The inclined side portions 14f and 14g of the sump are at a shallow angle to the bottom. The filled thermosetting resin composition of the sump vessel 14 and the inclination of these surfaces helps eliminate heat damage by reflecting infrared radiation toward the food tray 12 if the unit is used dry (without water in the sump vessel 14). The small size of the electrical enclosure eliminates some internal wiring completely and reduces the length of the balance of the wires by approximately 75%. Because neither the control nor the power cord is mounted through the enclosure/housing 20, the housing 20 may be installed last in the assembly procedure, thereby allowing unrestricted assembly of other components.

Attached legs are the most common cause of service problems for all countertop restaurant equipment. Screws loosen, bend or break, causing the need for repair. The legs 14L on the present invention are an integral part of the sump vessel 14. They cannot loosen, do not need installation, and do not have to be purchased as a separate part.

An air chamber between the well 14 and the housing 20 further reduces heat loss. Finally, the protection afforded by the housing 20 prevents the control knob 26a from being damaged during shipment or from being bumped accidentally.

By forming the sump vessel 14 from a uninary, dish-shaped container molded of a thermosetting resin heavily loaded with a mineral filler material to provide a rigid, monolithic sump body, it is possible to achieve a relationship in which the thermal conductivity $K^1$ of the food tray 12 is over 50 times greater and even 1,000 times greater than the normal conductivity $K^2$ of the sump vessel 14. This assures outstanding thermal efficiency. The sump vessel 14 also exhibits excellent impact strength and a high dielectric strength, enabling the electric heating element 16 to be supported by a portion of the sump vessel 14; namely, by the wall 19 where it passes through openings within the wall 19 (FIGS. 2 and 5). Thus, the electrical heating element 16 is supported by being cantilevered from a wall of the sump vessel 14 and is in this way held in spaced relationship between the bottom wall of the food pan 12 and the bottom wall 14e of the sump vessel 14 (FIG. 2).

The sump vessel 14 is also nearly impervious to chemical attack, e.g., from electrolytic oxalic acid etch. Moreover, mineral deposits inside the sump vessel 14 can be easily wiped away. Finally, because the sump vessel 14 is not electrically conductive, the unit presents a much lower electric shock hazard than metal.

Refer now to FIGS. 6–11 which illustrate another embodiment of the invention that is particularly well suited for use as a 7-quart to 11-quart round food warmer, i.e., for food such as casseroles, vegetables, soups, entrees, etc. The warming vessel 50 includes a cover 51, a metal pan 52 generally similar to the food pan 12 except that it is circular in cross-section, and a sump vessel 54 that is generally similar to the sump vessel 14 except for being circular in cross-section.

One object of this embodiment is to provide an electric heating element which, although hidden, is in direct heat conductive contact with the water contained in the sump vessel. Another object is to provide an electrically heated warming vessel in which two dead air spaces are provided between the electrical heating element and the outside environment, i.e., on the opposite side of the heating element from the liquid heat transfer medium, e.g., water that is held in the sump vessel. Another object is to provide a heat transfer unit or heat dissipator plate that will reduce the likelihood (and usually eliminating) what is known as thermal overshoot, i.e., overheating of the heating element, and yet will allow sufficient space for an optional drain opening which can be provided if needed in selected warmers. A further object is to provide a heat dissipator which seals the electric heating element from water contained in the sump, transfers heat efficiently, acts as a base for mounting thermostat elements and has a smoothly contoured upper surface that is easy to clean.

The sump vessel 54 can have the same composition as the sump vessel 14; preferably a strong, rigid heat-insulating, non-metallic monolithic body, e.g., formed from a cured thermosetting plastic such as polyester resin that is filled with mineral particles as described above in connection with the sump vessel 14. The food pan 52 is generally circular in cross section and includes a generally cylindrical side wall 52a, a bottom wall 52b, and an upper, wide mouth 52c which can be provided with a horizontally disposed, outwardly extending lip 52d that during use rests upon a horizontally disposed shoulder 60 at the top of the sump vessel 54 adjacent an open upwardly facing wide mouth 55 at the top of the sump vessel 54. Integral bosses 60a below shoulder 60 can be used to receive mounting screws for securing the vessel in a countertop opening, if desired.

The warming vessel 50 also includes a housing that includes two major components: an upper seamless stainless steel housing wall 56a and a housing base 56b that is preferably formed from a rigid material with good insulating qualities, most preferably of the same composition as the sump vessel 54.

The sump vessel 54 has a circular, slightly outwardly tapered side wall 58 which at its upper end has a horizontally disposed, outwardly extending supporting shoulder 60 around the upper open mouth 55 and an upwardly projecting flange 62 with an outwardly and downwardly recurved periphery 64 which includes a downwardly opening circular recess 65 for receiving the upper edge of the housing wall 56a.

Figure 10:
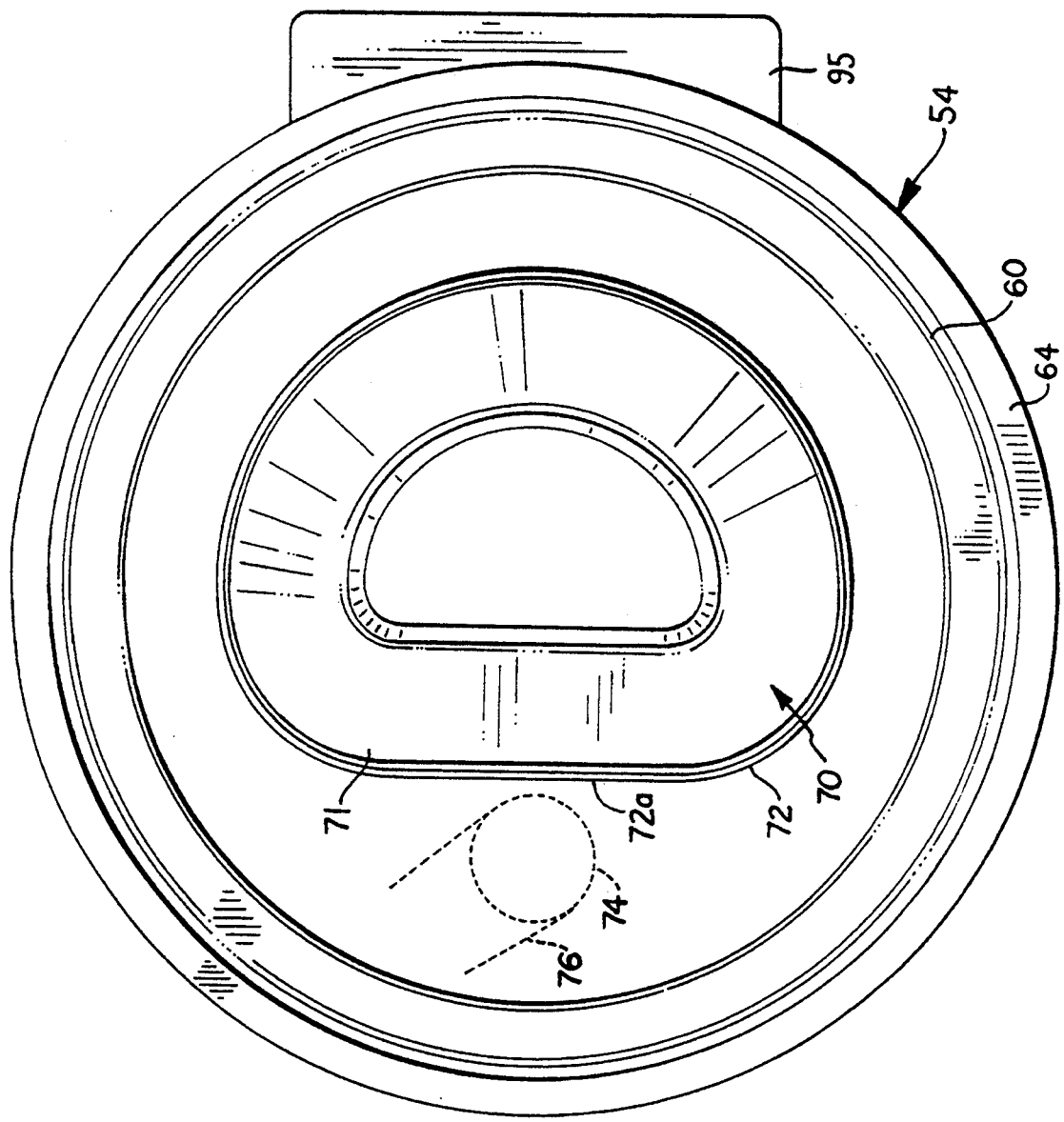
FIG. 10 is a horizontal cross-sectional view taken on line 10—10 of FIG. 6.
Figure 11:
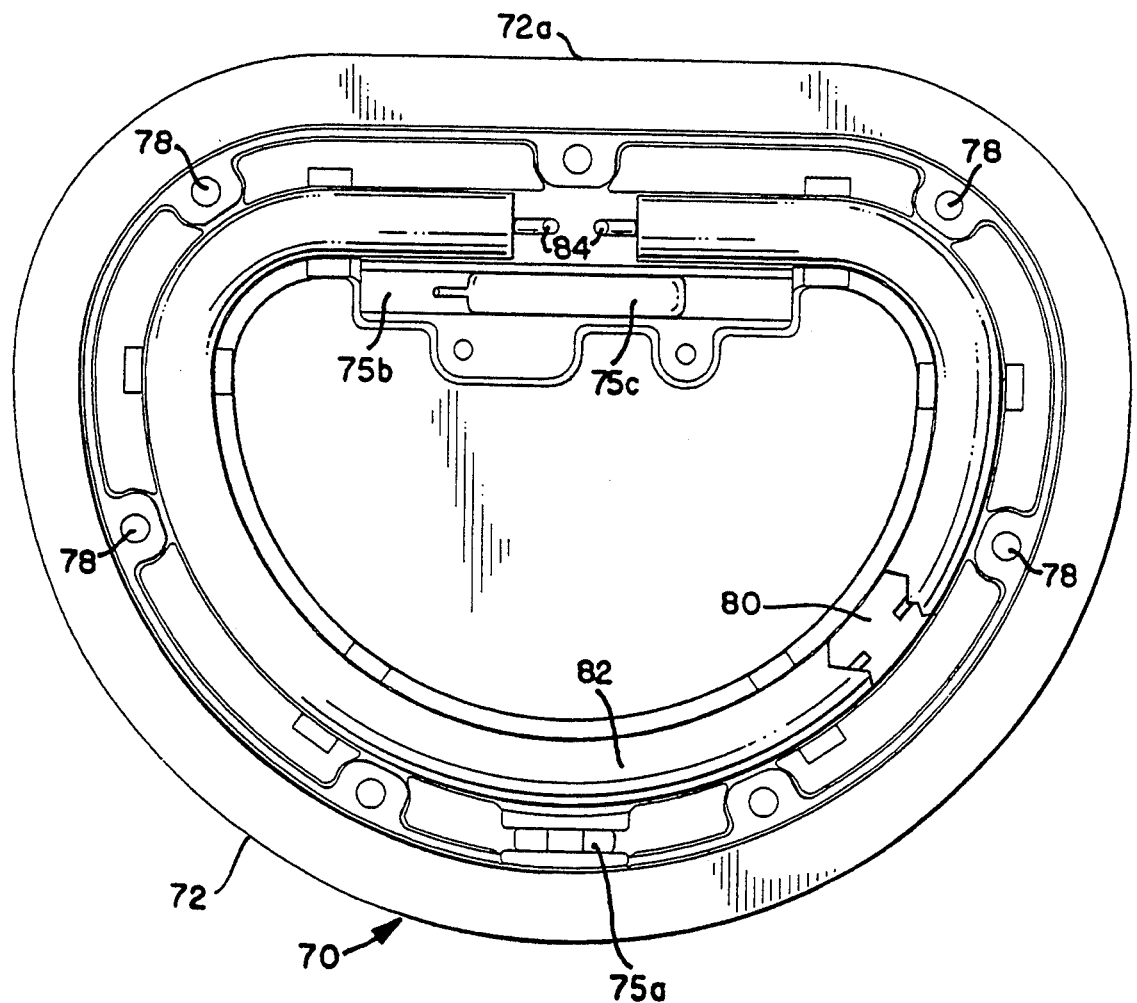
FIG. 11 is a bottom view of the heat dissipator plate and associated structure.

The sump vessel 54 also has a horizontal bottom wall 66 with an integral upwardly extending, generally D-shaped supporting collar 68 for supporting a heat dissipator member or plate 70 that has a peripheral edge 72 of the same shape, e.g., D-shaped as best seen in FIGS. 10 and 11. The heat dissipator plate 70 can have other shapes, but in any event is preferably mounted far enough to one side of the sump vessel 54, e.g., by being off center, to provide room in the bottom wall 66 for an optional drain opening 74 that can be used in some models of the warming vessels 50 in which it is desirable to drain liquid from the bottom. The drain opening 74 has a downwardly extending outlet duct 76 that extends through the bottom of the warming vessel 50 so that it can be connected to a drain pipe leading to the sewer (not shown). The advantage of making the peripheral edge 72 of the heat dissipator plate 70 other than circular, e.g., by having a flat section 72a (or if desired a recess [not shown] in place of the flat section 72a) is that the heat dissipator plate 70 will still have a substantial mass and yet there will be ample room to one side of it in the bottom wall 66 for the optional drain opening 74 if needed, e.g., in warmers which are to be recessed within a countertop and screwed permanently in place. In such a case, the drain opening 74 will allow water to be removed even though the warming vessel 50 cannot be tipped to pour out the water.

Figure 7:
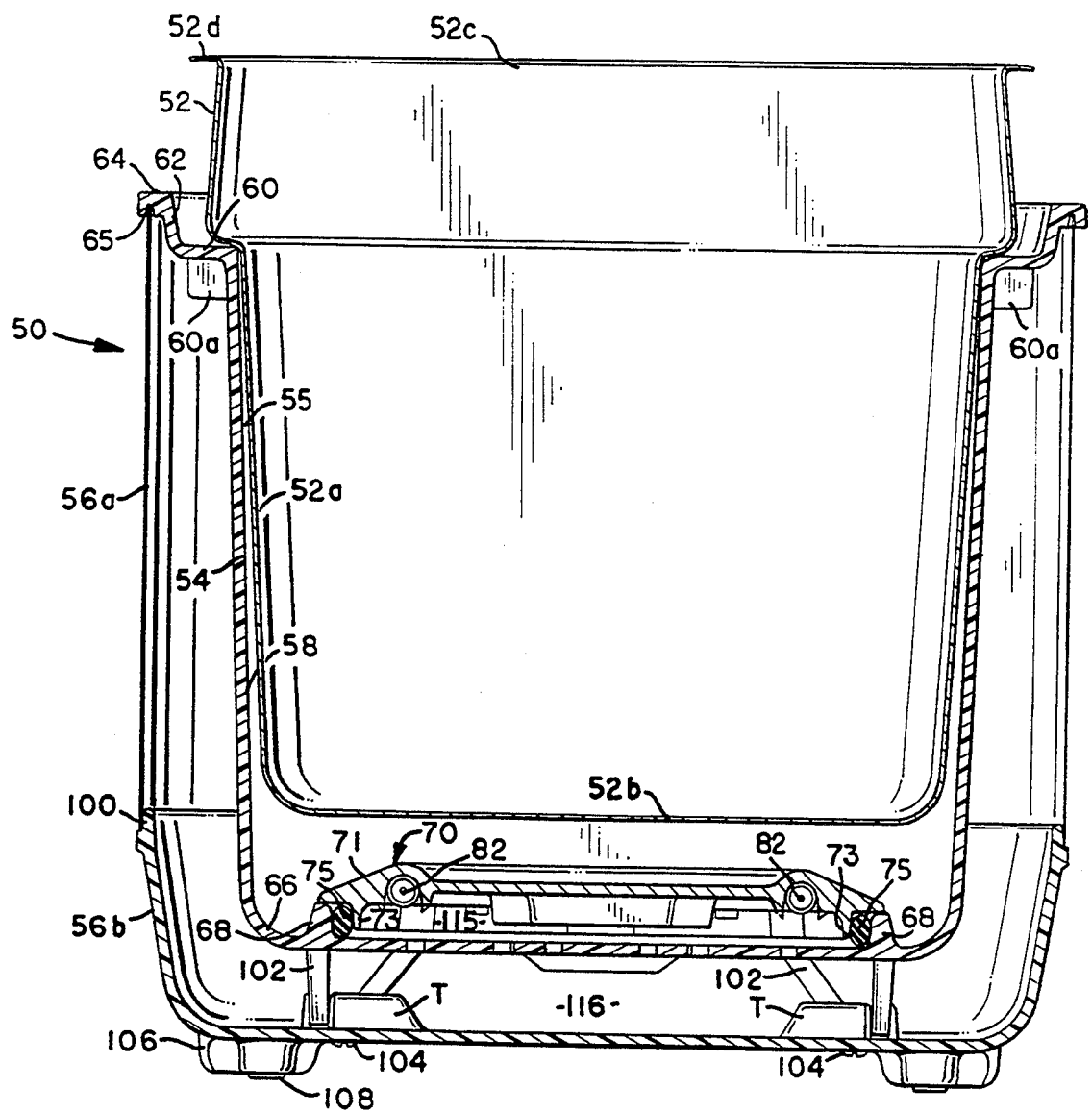
FIG. 7 is a vertical sectional view taken on line 7—7 of FIG. 6.
Figure 8:
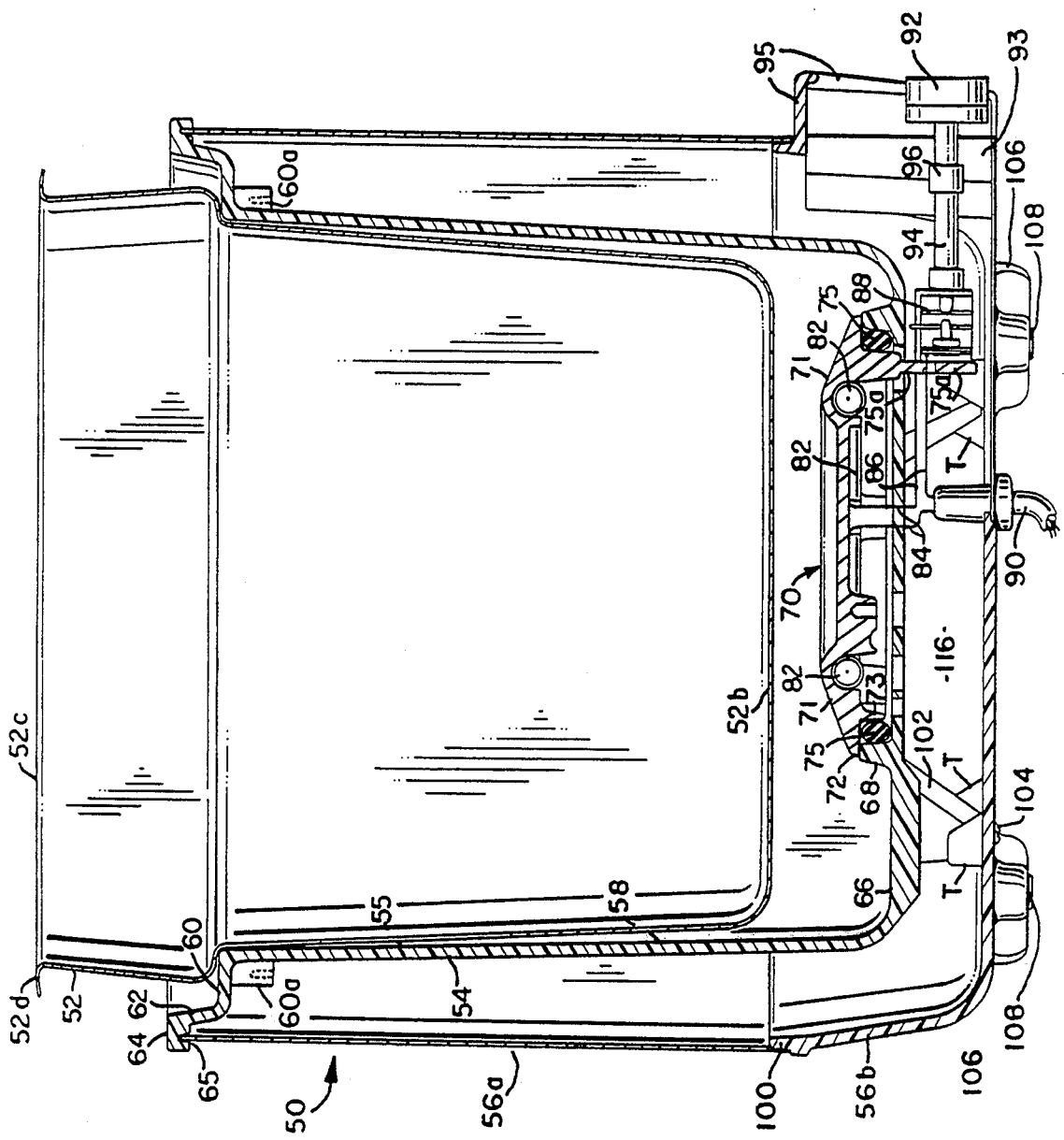
FIG. 8 is a vertical sectional view taken on line 8—8 of FIG. 6.
Figure 9:
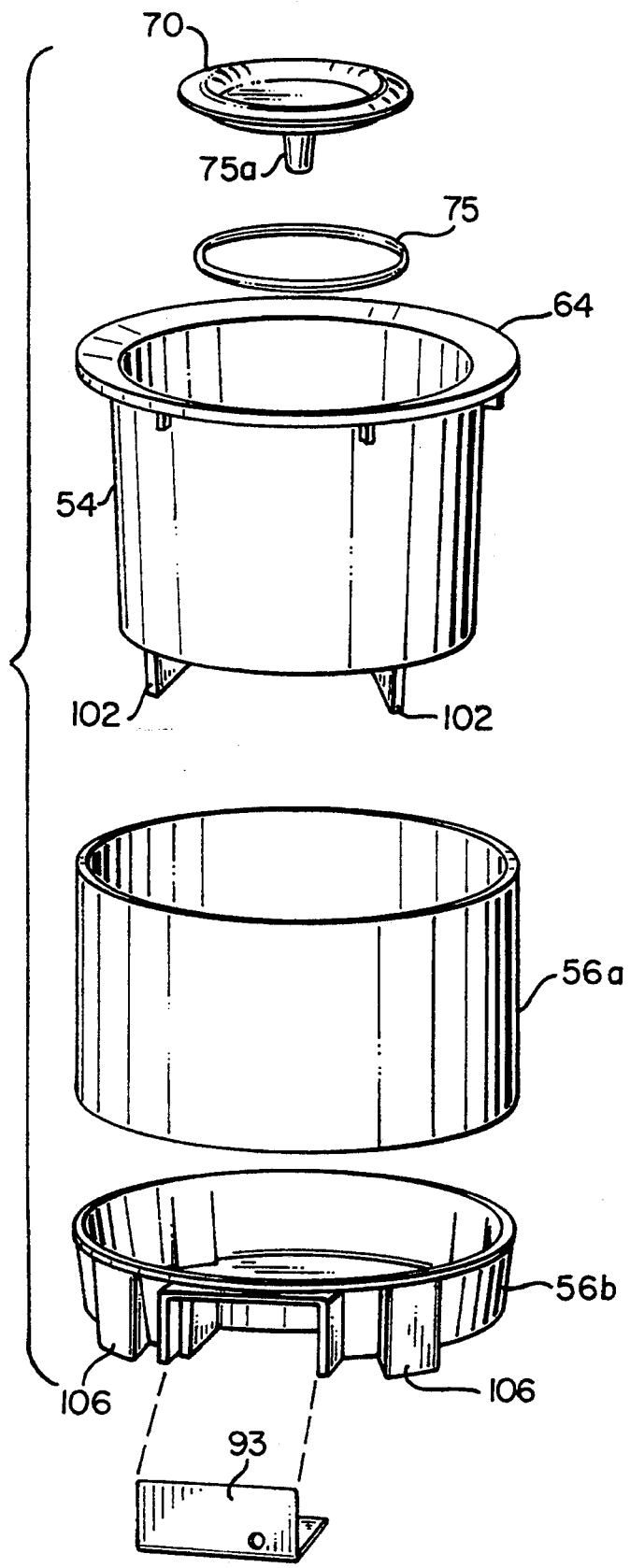
FIG. 9 is an exploded view of the embodiment of FIGS. 6–8.

The heat dissipator plate 70 is preferably provided with a smooth upper surface and outwardly and downwardly tapered edge portions 71. On the lower surface of the dissipator plate 70 is a downwardly extending D-shaped sealing flange 73 that is sized to fit within the collar 68 so that there is just sufficient space provided for a rubber O-ring 75 or other sealant. As shown in FIG. 7, the sealing flange 73 in conjunction with the O-ring 75 will provide a reliable seal against the collar 68 to prevent water normally held within the sump vessel 54 from entering dead air space 115 below the heat dissipator plate 70. The plate 70 is secured by means of screws 78 to the bottom wall 66 of the sump vessel 54. On the bottom of the heat dissipator plate 70 is provided an integral vertically disposed, downwardly extending thermostat mounting tab 75a that is connected to a temperature sensor which is a part of an adjustable thermostat 88. Alternatively, the dissipator plate 70 is provided with a downwardly facing recess 75b shaped to receive a different form of temperature sensor such as bulb and capillary thermostat element 75c which, when desired, can be used in place of the temperature sensor connected to the tab 75a.

The mass of the heat dissipator plate 70 is an important factor in transmitting heat effectively to the water contained in the sump vessel 54 and, thence, to the metal pan 52. In a typical embodiment of the invention, the heat dissipator plate 70 weighs about 8–10 ounces when formed from aluminum.

On the lower surface of the dissipator plate 70 is a downwardly facing D-shaped recess 80 of the proper size and cross-sectional shape to receive an electrical resistance heating such as a cal-rod heater 82 which has electrical terminals 84 that are wired by means of conductors 86 to the adjustable thermostat 88 in series with electrical power cord 90. The thermostat 88 is adjusted by means of a manual adjustment knob 92 on a temperature adjustment shaft 94 that extends from the thermostat 88 and includes a metal or rubber water deflection collar 96 to prevent any water that may land on the shaft 94 in the vicinity of the knob 92 from flowing along the shaft 94 to the thermostat 88. Electrical components are enclosed within a removable electrical cover or shield 93 that can be secured to the bottom portion 56b of the housing in any suitable manner as by means of screws or other fasteners. A hood 95 extends from base 56b to partially enclose and protect the knob 92.

The bottom portion 56b of the housing is formed from a rigid heat-insulating material and preferably has the same composition as the sump vessel 54, i.e., a plastic resin such as a thermosetting plastic, e.g., a polyester containing inert mineral filler particles such as fibers and/or granular particles, i.e., a powdered inert filler and fiberglass, to provide a strong, rigid, monolithic base member 56b that has excellent heat insulating qualities.

The base member 56b is generally cup-shaped and has a circular outline with a shoulder at 100 to receive and support the bottom edge of the housing member 56a. Member 56b is spaced a substantial distance, e.g., about one inch, away from the sump vessel 54 to provide a dead air space 116 around the bottom of the sump vessel 54. The sump vessel 54 is supported on the base 56b by means of standoffs 102 which are fastened to the base 56b as by screws 104. The base member 56b has spaced apart positioning tabs T for receiving the standoffs 102 to help lock the sump vessel 54 in place within the base 56b. On the bottom of the base 56b are provided integral downwardly extending legs 106 which, if desired, can be provided with rubber leg inserts 108 to help make the warming vessel 50 self-leveling.

The invention provides several important benefits. First, the electric heating element 82, although it is hidden, is kept in direct heat transfer contact with water contained in the sump vessel 54. Heat is thereby transferred readily from the electric heating element 82 to the water and to the food contained in the pan 52. In addition, two dead air spaces are provided at 115 and 116 between the heating element 82 and the outside environment. The dissipator plate 70 also provides mass sufficient to serve as a heat sink for preventing thermal overshoot of the heating element 82 and yet, because of its shape and position, allows ample space for the optional drain opening 74. The dissipator plate 70, besides transferring heat very effectively to the water in the sump vessel 54, also seals the electric heating element 82 from the water in the sump vessel 54 and serves as a mount for thermostat sensors to enhance the sensitivity of temperature measurement and thereby provide more accurate temperature control. The dissipator plate 70 also has a smooth upper surface that is easy to clean.

Figure 12:
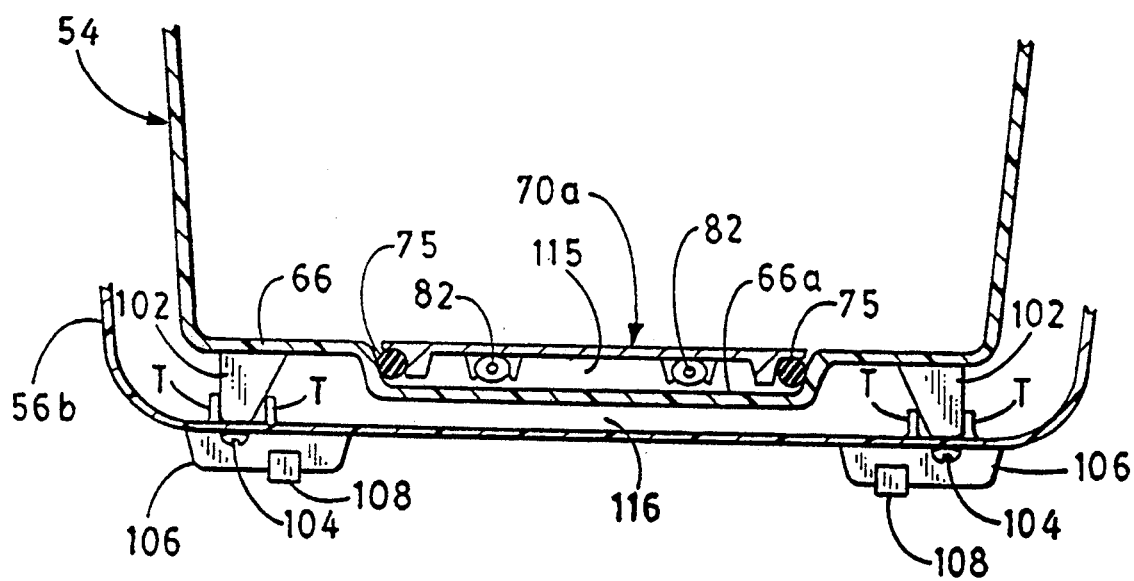
FIG. 12 is a view similar to FIG. 7 showing a modified form of heat dissipator plate and sump vessel.

Refer now to FIG. 12 in which the same numbers refer to corresponding parts already described. The embodiment of FIG. 12 is the same as that described except that the collar 68 in the bottom wall 66 of the sump vessel 54 is eliminated and replaced by a recess 66a in the bottom wall 66 for receiving the heat dissipator plate 70a which in this instance has a flat upper surface. The space 115 below the dissipator plate 70a is sealed in a similar manner to that already described by means of a rubber O-ring 75 to keep moisture out of the dead air space 115.

Many variations of the present invention within the scope of the appended claims will be apparent to those skilled in the art once the principles described above are understood.

What is claimed is:

1. A food warming apparatus suited for use in restaurants and cafeterias comprising,
   a food pan having side and bottom walls and an upwardly opening wide mouth, said pan being formed from metal so as to promote the conduction of heat to food contained within the pan,
   a sump vessel for receiving the food pan, said sump vessel comprising a unitary container body having side and bottom walls and an upper open mouth,
   the food pan being located within the sump vessel with a bottom portion of the food pan spaced from the sump vessel to form a chamber for containing water and steam between the sump vessel and the food pan,
   the sump vessel is molded from a thermosetting plastic resin containing inert mineral filler particles to provide a rigid monolithic body,
   the inert mineral filler particles are distributed through the rigid monolithic body of the sump vessel, and said sump vessel has heat insulating qualities for reducing heat loss from the warming apparatus and for enhancing the transmission of heat therewithin to the food pan,
   a metal heat dissipator member is connected to a wall of the sump vessel, said dissipator member has a surface exposed interiorally on the inside of the sump vessel in a position adapted to contact water when the water is placed in the sump vessel for transferring heat thereto,
   an electrical resistance heating element connected in heat conductive relationship with the heat dissipator member and positioned between the sump vessel and the exposed surface of the heat dissipator member,
   whereby heat produced by the heating element is transferred to the inside of the sump vessel through the heat dissipator member for heating food contained in the food pan within the sump vessel.

2. The food warming apparatus of claim 1 wherein a dead air space is provided between the heat dissipator member and the wall of the sump vessel and the heating element is located in the dead air space and in contact with a wall of the heat dissipator member facing said dead air space.

3. The food warming apparatus of claim 1 wherein a seal is provided between the heat dissipator member and a wall of the sump vessel to isolate the electric heating element from the inside of the sump vessel.

4. The food warming apparatus of claim 1 wherein the warming apparatus includes a housing surrounding the sump vessel.

5. The food warming apparatus of claim 4 wherein the housing includes an upright housing wall member and a cup-shaped lower portion for enclosing the bottom wall of the sump vessel, and the lower portion of the housing is spaced below the bottom wall of the sump vessel to provide a dead air space therebetween.

6. The apparatus of claim 5 wherein the lower portion of the housing is formed from a plastic resin containing an inert mineral filler to provide a rigid, monolithic body and the mineral filler is distributed throughout the monolithic body of the lower portion of the housing and said housing provides heat insulating qualities for reducing heat loss therethrough.

7. The apparatus of claim 6 wherein the lower portion of the housing is cup-shaped and has integral legs extending downwardly therefrom for supporting the warming apparatus upon a surface.

8. The apparatus of claim 1 wherein the heat dissipator member is a metal heat dissipator plate, the heat dissipator plate has a sealing surface that is sealed to the sump vessel and the electric heating element is connected to a lower surface of the heat dissipator plate centrally of the seal to isolate the electric heating element from moisture when water is placed within the sump vessel.

9. The apparatus of claim 1 wherein the sump vessel has a collar that projects upwardly from the bottom wall thereof and the heat dissipator member comprises a plate, sealing means for sealing the plate to the collar, and the electric heating element is connected to a lower surface of the plate and is positioned between the plate and the bottom wall of the sump vessel.

10. The apparatus of claim 1 wherein the bottom wall of the sump vessel has a downwardly extending, upwardly opening recess and the heat dissipator member is a plate mounted within said recess.

11. The apparatus of claim 1 wherein the sump vessel is surrounded at least partially by a housing having a cup-shaped base portion and the base portion is formed from a thermosetting plastic resin containing inert mineral filler particles to provide a rigid heat-insulating body for reducing heat loss and for promoting the transfer of heat from the heating element inwardly through the heat dissipator member into the food pan and to the food contained therein.

12. The apparatus of claim 2 wherein a cup-shaped base member is spaced below a bottom portion of the sump vessel with a space therebetween to provide two air spaces below the heating element for reducing heat loss from the heating element to the environment.

* * * * *